US012058251B2

(12) United States Patent
Liu (10) Patent No.: US 12,058,251 B2
(45) Date of Patent: Aug. 6, 2024

(54) SIMULATION-BASED TESTING OF A KEY MANAGEMENT SERVER

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 311 days.

(21) Appl. No.: 17/668,698

(22) Filed: Feb. 10, 2022

(65) Prior Publication Data

US 2023/0254137 A1 Aug. 10, 2023

(51) Int. Cl.
*H04L 9/08* (2006.01)
*H04L 9/30* (2006.01)
*H04L 9/32* (2006.01)

(52) U.S. Cl.
CPC .......... *H04L 9/0861* (2013.01); *H04L 9/3066* (2013.01); *H04L 9/3268* (2013.01)

(58) Field of Classification Search
CPC .... H04L 9/0861; H04L 9/3066; H04L 9/3268
See application file for complete search history.

(56) References Cited

U.S. PATENT DOCUMENTS

| 2012/0331287 | A1* | 12/2012 | Bowman | H04L 9/0844 |
| | | | | 713/155 |
| 2014/0189890 | A1* | 7/2014 | Koeberl | G09C 1/00 |
| | | | | 726/34 |
| 2019/0074981 | A1* | 3/2019 | Loreskar | H04L 9/007 |
| 2020/0313873 | A1* | 10/2020 | Mondello | H04L 9/0825 |
| 2020/0351653 | A1* | 11/2020 | Khan | H04W 12/35 |
| 2022/0060455 | A1* | 2/2022 | Rosenstein | H04L 9/0894 |
| 2023/0038949 | A1* | 2/2023 | Kido | G06F 21/73 |

FOREIGN PATENT DOCUMENTS

WO WO-2021113881 A1 * 6/2021 ............. G06F 21/62

* cited by examiner

*Primary Examiner* — Darshan I Dhruv
(74) *Attorney, Agent, or Firm* — Greenberg Traurig (57) ABSTRACT

The techniques described herein relate to a system including a simulator for instantiating a simulated device associated with a device public key and at least one generated device public key and generated device certificate. The system includes a server configured to receive the device public key, generate a server unique device secret (UDS) using the device public key and a server private key, generate at least one generated server key using the server UDS, generate at least one generated server certificate using the at least one generated server key, receive the at least one generated device key and at least one generated device certificate, and validate the at least one generated device key and generated device certificate by comparing the at least one generated device key and generated device certificate to the at least one generated server key and generated server certificate, respectively.

20 Claims, 6 Drawing Sheets

SIMULATION-BASED TESTING OF A KEY MANAGEMENT SERVER

FIELD OF THE TECHNOLOGY

At least some embodiments disclosed herein relate generally to semiconductor devices and, in particular, to key and certificate generation on secure semiconductor devices.

BACKGROUND

Various secure computing devices rely on communications with a KMS to validate cryptographic data. Currently, solutions rely on physically testing devices that can communicate with a KMS prior to being released from manufacturing. Such an approach suffers from numerous inefficiencies due to the use of physical computing devices.

DETAILED DESCRIPTION

A key management server (KMS) is a computing device or network of computing devices that manage keys, certificates, and other cryptographic data for one or more secure computing devices. During manufacturing, secure computing devices are provisioned with cryptographic data (e.g., asymmetric key pairs, digital certificates, etc.), and communications between the secure communications devices and the KMS are established to validate that the KMS functions properly before the secure computing devices are released from a secure manufacturing location. Specifically, physical secure computing devices are required to confirm that the functions performed by the KMS are indeed functioning properly. Without physical testing, devices may be shipped without confirming that the KMS can properly authenticate such devices. Should such devices be shipped, they will generally be required to be returned to the manufacturer for debugging. As such, most manufacturers will physically test all such secure computing devices before releasing them from manufacturing.

Requiring physical secure computing devices ensures that these devices will not be rendered inoperable, but at a significant cost. First, such a system requires a large number of secure computing devices, which increases the expenses of a manufacturer, increases setup time, increases supply chain complexity, and provides low reliability. Second, any change to the KMS or to the secure computing devices results in a significant number of updates. For example, a firmware update or KMS software update effectively requires re-testing to ensure the KMS will function accurately. Third, similarly, a hardware change to a secure computing device (e.g., bus change) requires a new testing procedure that will require the manufacture of a large number of secure computing devices to test, updates to the KMS, cross-testing with existing secure computing devices, etc. Fourth, many secure computing devices use security mechanisms to prevent key leakage. For example, many secure computing devices use a physically unclonable function (PUF) to generate an asymmetric key pair locally. Such mechanisms are inherently hidden in the secure computing device and thus require the physical secure computing device to obtain the asymmetric key data. As such, the use of physical secure computing devices to test a KMS suffers from numerous technical challenges, remedied by the example embodiments.

Figure 1:
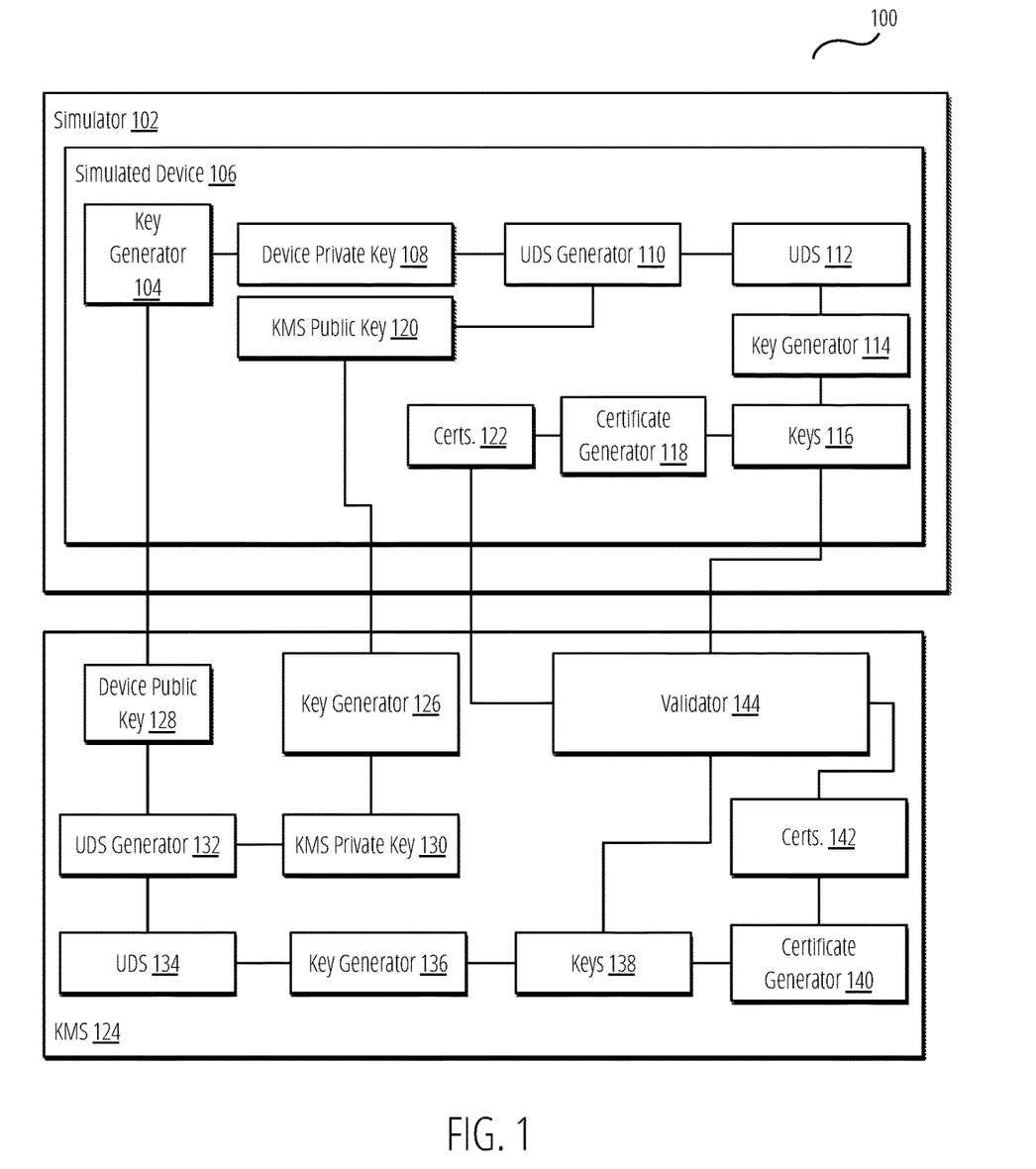
FIG. 1 is a block diagram illustrating a system for testing a KMS using a device simulator according to some of the example embodiments.

FIG. 1 is a block diagram illustrating a system for testing a KMS using a device simulator according to some of the example embodiments.

In the illustrated embodiment, system 100 includes a simulator 102 and a KMS 124. Although one simulator (simulator 102) and one KMS (KMS 124) are illustrated, multiple simulators and/or multiple KMS devices may be implemented, and the disclosure is not limited as such.

In an embodiment, simulator 102 can comprise a computing device (e.g., server, desktop, mobile device) running simulation software to execute some of all of the functions described herein. In some embodiments, simulator 102 can include cryptographic accelerators or security devices (e.g., hardware security modules) to perform cryptographic operations (e.g., key or certificate generation). In some embodiments, the simulator 102 can comprise dedicated hardware (e.g., field-programmable gate array or application-specific integrated circuits) to perform some or all of the functionality described herein.

In an embodiment, the KMS 124 can comprise a computing device such as a server or a plurality of computing devices. In some embodiments, the KMS 124 can be deployed on cloud infrastructure and can comprise virtual computing devices such as virtual machines or containers.

In an embodiment, simulator 102 is capable of generating multiple simulated secure computing devices, such as simulated device 106. In the illustrated embodiment, only a single simulated device (simulated device 106) is illustrated; however, the disclosure is not limited to a single simulated device. Further, while the simulated device 106 is illustrated as having various subcomponents, some of these subcomponents can be external to a simulated device. In some embodiments, the simulated device 106 can comprise a software routine, thread, process, program, or another type of executable code. In an embodiment, simulator 102 can be configured to generate a plurality of simulated devices in response to a command to begin testing the KMS 124. In some embodiments, a host machine (not illustrated) can initialize the simulator 102 with one or more parameters defining the simulated device 106, which allows the simulator to set such parameters which may modify the operation of the simulated device 106. As one example, simulator 102 can select a key generation algorithm to use.

In an embodiment, simulated device 106 includes a key generator 104. In some embodiments, the key generator 104 can comprise a software key generation routine. In some embodiments, the key generator 104 can comprise a custom software library for generating keys. In other embodiments, key generator 104 can comprise the OpenSSL® command-line tool by The OpenSSL Software Foundation, Inc. of Adamstown, Maryland In this embodiment, existing libraries of the OpenSSL® tool. In some embodiments, key generator 104 is configured to generate an asymmetric keypair. In some embodiments, this asymmetric keypair can comprise an Elliptic-curve Diffie-Hellman (ECDH) key pair. In the illustrated embodiment, the simulated device 106 can generate a private device key 108 ($sk_D$) and public device key 128 ($pk_D$). In some embodiments, simulated device 106 can store the private device key 108 and public device key 128 internally. For example, in some embodiments, simulated device 106 can be associated with a dedicated memory region to store key and certificate data, and private device key 108 and public device key 128 can be stored in this dedicated memory region. In other embodiments, an HSM can be used to store private device key 108 and public device key 128.

In an embodiment, the simulated device 106 further includes a Unique Device Secret (UDS) generator, UDS generator 110 capable of generating a UDS 112. In some embodiments, the UDS 112 comprises a statistically unique, device-specific, secret value. In an embodiment, the UDS 112 generated by UDS generator 110 corresponds to a UDS as used in a Device Identity Composition Engine (DICE) architecture according to the relevant standards promulgated by the Trusted Computing Group of Beaverton, Oregon, the details of which are not repeated herein. As described previously, in existing DICE solutions, the UDS is generally a physically protected secret value. That is, a device includes a latch that prevents access to the UDS except for during the initialization of the device. Further, in some devices, a PUF is used to seed the UDS, thus further tying the UDS to the hardware.

By contrast, the UDS generator 110 generates a UDS 112 using asymmetric cryptography. Specifically, the UDS generator 110 can use the private device key 108 ($sk_D$) and a public KMS key 120 ($pk_K$). In some embodiments, the public KMS key 120 also comprises an asymmetric public key. In some embodiments, the asymmetric public key can comprise an ECDH public key. In some embodiments, the UDS generator 110 is configured to generate UDS 112 by combining the private device key 108 and public KMS key 120. Specifically, the UDS generator 110 can compute $UDS_D = pk_K \cdot sk_D$. That is, the UDS generator 110 combines the private device key 108 and public KMS key 120, takes the x component of the affine coordinates, and can optionally apply a key derivation function (KDF). As will be discussed, this UDS 112 can be computed independently by KMS 124.

In an embodiment, after generating the UDS 112, the simulated device 106 can generate keys 116 using a key generator 114. In some embodiments, the key generator 114 can comprise an Elliptic Curve Digital Signature Algorithm (ECDSA) key generator. In some embodiments, the keys 116 can comprise DICE keys. As used herein, a DICE key refers to one or both of a DeviceID key and an Alias key. In an embodiment, the key generator 114 can be further configured to compute a hash or other similar value of an L0 code (referred to as $TCI_{L0}$) according to the DICE standards. In some embodiments, this L0 code can be stored in one location by simulator 102. In some embodiments, the hash or other similar value can be precomputed by simulator 102 and provided to the key generator 114. In some embodiments, the key generator 114 can first combine the UDS 112 and the value of $TCI_{L0}$ to generate a common device identifier ($CDI_{L0}$). In some embodiments, the key generator 114 can then use the value of $CDI_{L0}$ to seed the key generator (e.g., the ECDSA key generator) to generate the keys 116.

The simulated device 106 further includes a certificate generator 118. In an embodiment, the certificate generator 118 can comprise an embedded certificate authority (ECA) that can generate digital certificates 122 using keys 116. In some embodiments, certificate generator 118 can generate a device certificate (a digital certificate authenticating the L0 code) using the DeviceID key. Alternatively, or in conjunction with the foregoing, the certificate generator 118 can generate an Alias certificate using the DeviceID key and Alias key. As illustrated, the simulated device 106 can provide the keys 116 and certificates 122 to KMS 124 for validation, described next.

In an embodiment, the KMS 124 includes key generator 126. In an embodiment, the key generator 126 operates identically to that of key generator 104. Specifically, the key generator 126 can comprise a software key generation routine. In some embodiments, the key generator 126 can comprise a custom software library for generating keys. In other embodiments, key generator 126 can comprise the OpenSSL® command-line tool by The OpenSSL Software Foundation, Inc. of Adamstown, Maryland In this embodiment, existing libraries of the OpenSSL® tool. In some embodiments, key generator 126 is configured to generate an asymmetric keypair. In some embodiments, this asymmetric keypair can comprise an ECDH key pair. In the illustrated embodiment, the key generator 126 can generate a private KMS key 130 ($sk_K$) and public KMS key 120 ($pk_K$). In some embodiments, key generator 126 can store the private KMS key 130 and public KMS key 120 internally. For example, in some embodiments, KMS 124 can be associated with a dedicated memory region to store key and certificate data, and private KMS key 130 and public KMS key 120 can be stored in this dedicated memory region. In other embodiments, an HSM can be used to store private KMS key 130 and public KMS key 120. As illustrated, the KMS 124 can transmit the public KMS key 120 to the simulator 102 and to the simulated device 106. As previously discussed, the simulated device 106 can use the public KMS key 120 to generate UDS 112.

In an embodiment, the KMS 124 further includes a UDS generator 132. In an embodiment, the UDS generator 132 generates a UDS 134 using asymmetric cryptography. Specifically, the UDS generator 132 can use the private KMS key 130 ($sk_K$) and a public device key 128 ($pk_D$). In some embodiments, the public device key 128 also comprises an asymmetric public key. In some embodiments, the asymmetric public key can comprise an ECDH public key. In some embodiments, the UDS generator 132 is configured to generate UDS 134 by combining the private KMS key 130 and public device key 128. Specifically, the UDS generator 132 can compute $UDS_K = pk_D \cdot sk_K$. That is, the UDS generator 132 combines the private KMS key 130 and public device key 128, takes the x component of the affine coordinates, and can optionally apply a KDF. In some embodiments, by using ECDH key pairs, the system 100 can ensure that $UDS_K = UDS_D$ while private keys remain hidden and only public keys are shared. Thus, KMS 124 and simulated device 106 can independently and securely generate the same UDS, which avoids the need for the physical security of the UDS required in existing systems.

In an embodiment, the KMS 124 includes a key generator 136 that generates keys 138 from the UDS 134. In some embodiments, the key generator 136 operates identically to key generator 114, and those details are not repeated herein in their entirety. Specifically, the key generator 136 can generate DICE keys using the UDS 134. These keys 138 are then passed to certificate generator 140, which generates certificates 142 based on the keys 138. The operation of certificate generator 140 is identical to certificate generator 118, and those details are not repeated herein. In brief, the certificate generator 140 can generate a device certificate (a digital certificate authenticating the L0 code) using the DeviceID key. Alternatively, or in conjunction with the foregoing, the certificate generator 140 can generate an Alias certificate using the DeviceID key and Alias key. Notably, key generator 136 and certificate generator 140 operate identically to key generator 114 and certificate generator 118. Further, keys 138 and certificates 142 should be identical to keys 116 and certificates 122 given the shared UDS values (UDS 112 and UDS 134). Thus, the disclosure does not repeat the operation of these shared components, keys, and certificates in detail when describing KMS 124. Notably, since the KMS 124 and simulated device 106 are software base, any code needed for hash generation can be shared. That is, the L0 code can be easily accessed by both KMS 124 and simulated device 106, allowing for key and certificate generation independent of one another.

In an embodiment, the KMS 124 includes a validator 144. As illustrated, validator 144 receives keys 116, certificates 122, keys 138, and certificates 142. In some embodiments, the validator 144 can compare each key or certificate generated by simulated device 106 with a corresponding key or certificate generated by the KMS 124 to confirm the devices are functioning properly. For example, validator 144 can compare the DeviceID key generated by the simulated device 106 with the DeviceID key generated by the KMS 124. If these keys are equal, validator 144 can confirm the proper functioning of both the simulated device 106 and the KMS 124. If the values are not equal, a developer can adjust the functioning of either device and re-run the simulation quickly. In an embodiment, validator 144 performs such a comparison for each key and certificate generated and can generate an output or signal that indicates the results of the comparisons. In some embodiments, if all comparisons pass, the KMS 124 can generate its own manufacturer's certificate for the simulated device 106. In some embodiments, this certificate can comprise a $CA_{MFG}Cert_{L0}$ certificate as defined by DICE standards.

Figure 2:
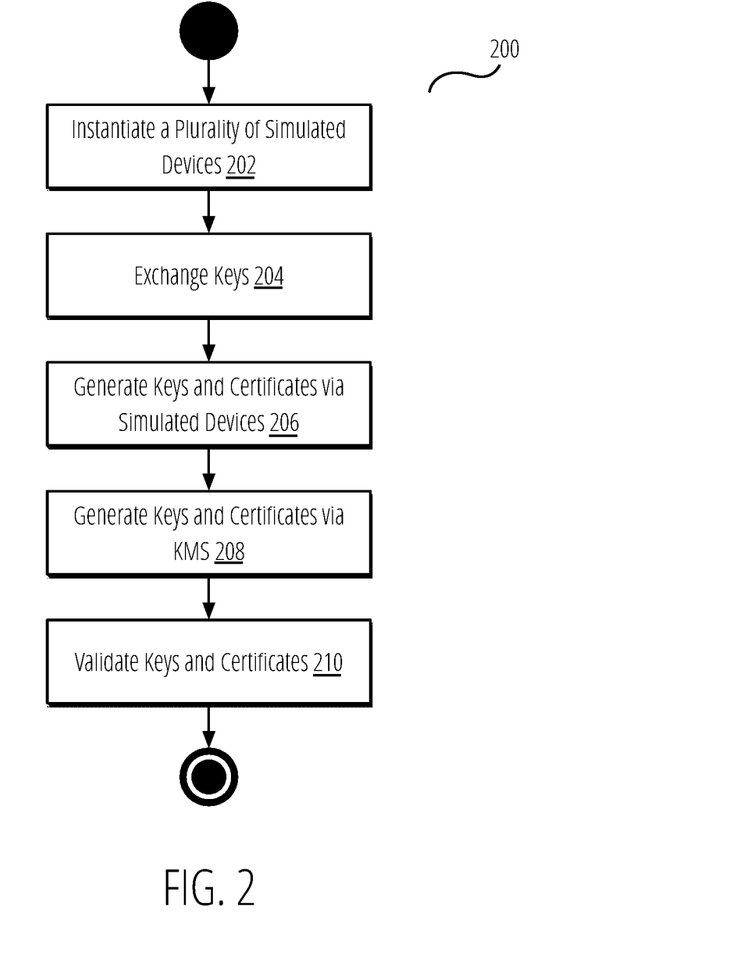
FIG. 2 is a flow diagram illustrating a method for testing a KMS using a device simulator according to some of the example embodiments.

FIG. 2 is a flow diagram illustrating a method for testing a KMS using a device simulator according to some of the example embodiments.

In step 202, method 200 can include instantiating a plurality of simulated devices.

As described in connection with FIG. 1, a simulated device refers to a software implementation of a secure computing device. In some embodiments, a simulated device includes a plurality of layers of software. In general, above a hardware layer are various layers of code, referred to as Layer 0 (L0), Layer 1 (L1), Layer 2 (L2), . . . Layer N (LN). In general, as the simulated device "boots," each layer of code is sequentially loaded into memory and executed. For example, a secure enclave may include a trusted execution environment (TEE) as a hardware layer, an enclave runtime as the L0 code, and an enclave applet as the L1 code. More complex devices may have more layers. For example, a complex operating system may have a processor boot read-only memory as the hardware layer, a boot loader as the L0 code, a high-level operating system (HLOS) as the L1 code, a container runtime (e.g., Docker) as the L2 code, and a containerized application as L3 code. The description places no limit on the number of layers. In general, a lower layer passes control of the computing system to the next higher layer at one or many points during the operation of the simulated device. In an embodiment, method 200 may not directly execute the various layers of code. Instead, method 200 may only require access to images of the code to compute hashes of the images, or may be provided with the hash value directly, as will be discussed.

Method 200 places no limit on the number of instantiated devices. In some embodiments, each instantiated device can be functionally identical (but use different keys, UDS values, etc.). In other embodiments, the instantiated devices can be heterogeneous and execute different operations and/or can utilize different hash values. In some embodiments, the instantiated devices can also be used to simulate different public key infrastructure (PKI) algorithms.

In step 204, method 200 can include exchanging keys. In some embodiments, step 202 can be performed by a device simulator (e.g., simulator 102). In some embodiments, the device simulator allows for communications between each instantiated device and a KMS (e.g., KMS 124). In some embodiments, each instantiated device can comprise a thread, process, or another programmable object, and the simulator can comprise its own parent thread, process, or another programmable object that can either receive messages from the simulated device or generate messages on behalf of the simulated devices. In step 204, each simulated device transmits its public key to the KMS. As described more fully in FIG. 3, each instantiated device can be configured to generate an asymmetric key pair, and the simulator can coordinate the transmittal of a public key portion to the KMS. Further, method 200 can include receiving a public key of the KMS. In some embodiments, this receipt may only need to occur once for a given testing run since the KMS may only utilize one asymmetric key pair.

In step 206, method 200 can include generating keys and certificates via the simulated devices. Details of this step are provided in further detail in the description of FIG. 3. In brief, each device uses its own private key and the KMS public key to initiate a DICE key and certificate generation process. Unlike existing DICE implementations, each simulated device will use its own private key and the KMS public key to generate a synthetic UDS value that is used for later DICE computations. After computing the necessary keys and certificates, each simulated device will report its keys and certificates to the KMS.

In step 208, method 200 can include generating keys and certificates via the KMS. Details of this step are provided in further detail in the description of FIG. 4. In brief, the KMS will use its own private key and a public key of a given simulated device to initiate a DICE key and certificate generation process for the given simulated device. Unlike existing DICE implementations, the KMS will use its own public key and the received private key of the simulated device to generate a synthetic UDS value that is used for later DICE computations.

In step 210, method 200 can include validating the keys and certificates of the simulated devices. In an embodiment, in step 210, the KMS obtains, for each device, a set of keys and certificates generated by a simulated device. The KMS also obtains the set of keys and certificates for the simulated device it generated independently. In step 210, method 200 can include iteratively determining if the keys and certificates generated for a given simulated device by the given simulated device match the keys and certificates generated by the KMS. If so, method 200 can verify that the proposed simulated device will function properly with the KMS. If not, method 200 can flag or signal that the proposed simulated device and KMS are incompatible and that further inspection is needed.

Generally, changes to the KMS or secure devices are inevitable. For secure devices that have not yet been released from manufacturing, a simulation of the underlying code (and, in some scenarios, hardware) can aid in testing if the proposed secure devices will work correctly before finalizing the secure device design. Specifically, the example embodiments can determine if DICE functionality for a given device will operate as expected and allow for certificate generation by a KMS. In general, the UDS is one or the only hardware-dependent piece of a DICE device. All other aspects are generally controllable via software. Thus, the example embodiments replace the hardware-based UDS with a software-derived UDS. In this manner, aspects of a DICE architecture after the UDS are semi-deterministic. As such, the simulated device can fully simulate a DICE-enabled device but using a derived UDS. Given that the UDS is only an input, it can be ensured that the DICE functionality, L0-LN code, will function properly when the software-derived UDS is replaced with a hardware-based UDS. Further, in some embodiments, the software-derived UDS can actually be written to hardware before releasing from manufacturing. That is, instead of using a PUF or similar mechanism, method 200 can be used to validate UDS values for any number of simulated devices. These UDS values can then be written to secure devices and associated at the KMS. In this manner, all testing of keys and certificates can be confirmed in software and only once validated quickly can then cryptographic primitives be persisted to the secure devices. Additionally, the simulated testing can be used to validate KMS changes prior to rolling out such changes. In some embodiments, existing devices can be modeled using a simulator (e.g., actual UDS values can be simulated), and the method 200 can be executed. If the new KMS implementation generates different keys or certificates, this error can be used to modify the KMS prior to releasing an update to the KMS. In the example embodiments, the simulator can also provide the capability to simulate negative test cases (i.e., test cases where the wrong key or wrong digital certificate is used). With negative test cases, the KMS is expected to deny access and provide a corresponding response; failure to meet these expectations can be used as evidence of an issue with the KMS (or possibly device) for further analysis. Additionally, a failure to meet these expectations can indicate the KMS will not give permission to a device that does not have appropriate permissions (e.g., an incorrect signature). Therefore, the KMS and device are secured from hacking without the correct key and signature. In general, negative test cases are difficult or impossible to achieve when physical devices are used due to the cost of manufacturing a "faulty" device or intentionally introducing errors into live software.

Figure 3:
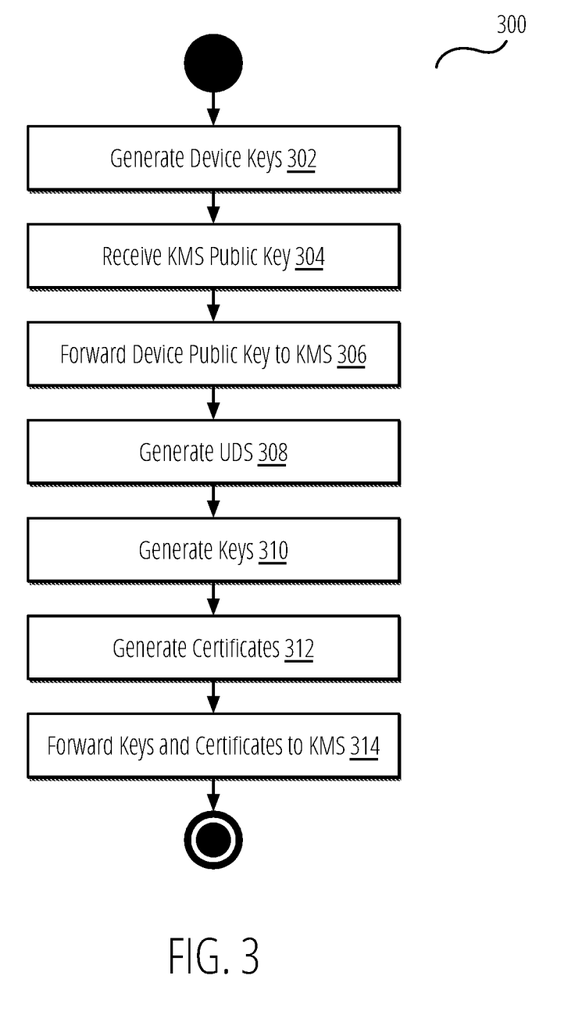
FIG. 3 is a flow diagram illustrating a method for generating keys and certificates by a simulated device according to some of the example embodiments.

FIG. 3 is a flow diagram illustrating a method for generating keys and certificates by a simulated device according to some of the example embodiments.

In step 302, method 300 can include generating device keys. In some embodiments, these devices keys can comprise an asymmetric key pair. In some embodiments, the asymmetric key pair can comprise an ECDH key pair. In some embodiments, the ECDH key pair includes a public key and a private key. In some embodiments, method 300 can execute step 302 upon instantiation of a simulate device (e.g., step 202).

In step 304, method 300 can include receiving a KMS public key. In some embodiments, method 300 receives the KMS public key directly from the KMS. In other embodiments, a simulator can provide the KMS public key to the simulated device (e.g., as a cached copy). In some embodiments, step 302 can be executed as part of step 204.

In step 306, method 300 can include forwarding or sending the device public key to the KMS. In some embodiments, method 300 sends or forwards the device public key directly to the KMS. In other embodiments, a simulator can receive the device public key and send the device public key to the KMS. In some embodiments, step 306 can be executed as part of step 204.

In step 308, method 300 can include generating a UDS. In an embodiment, method 300 can generate a UDS using asymmetric cryptography. Specifically, method 300 can use the private device key ($sk_D$) and the public KMS key ($pk_K$). In some embodiments, the public KMS key also comprises an asymmetric public key. In some embodiments, the asymmetric public KMS key can comprise an ECDH public key. In some embodiments, method 300 can include generating the UDS by combining the private device key and public KMS key. Specifically, method 300 can include computing $UDS_D = pk_K \cdot sk_D$. That is, method 300 can combine the private device key and public KMS key, take the x component of the affine coordinates, and can optionally apply a KDF. In some embodiments, step 308 can be executed as part of step 204.

In step 310, method 300 can include generating one or more keys. In some embodiments, method 300 can generate keys according to an ECDSA algorithm. In some embodiments, the keys can comprise DICE keys. In some embodiments, the DICE keys include a DeviceID key and an Alias key. In an embodiment, the method 300 can be further configured to compute a hash or other similar value of a L0 code (referred to as $TCI_{L0}$) according to the DICE standards. In some embodiments, method 300 can include combining the UDS and the value of $TCI_{L0}$ to generate a common device identifier ($CDI_{L0}$). In some embodiments, method 300 can then use the value of $CDI_{L0}$ to seed the key generator (e.g., the ECDSA key generator) to generate the DeviceID and Alias keys. In some embodiments, step 310 can be executed as part of step 204.

In step 312, method 300 can include generating one or more digital certificate using the DeviceID and Alias keys. In some embodiments, method 300 can generate a device certificate (a digital certificate authenticating the L0 code) using the DeviceID key. Specifically, in an embodiment, the Device certificate can include the DeviceID public key portion and can be signed using the private key portion of the DeviceID. Alternatively, or in conjunction with the foregoing, method 300 can generate an Alias certificate using the DeviceID key and Alias key. Specifically, in some embodiments, method 300 can include the Alias public key portion in a digital certificate and sign the digital certificate using the private key portion of the DeviceID. In some embodiments, step 312 can be executed as part of step 204.

In step 314, method 300 can include transmitting the keys and certificates to a KMS for validation. In some embodiments, method 300 can include transmitting the DeviceID key pair, the Alias key pair, the device certificate, and the alias certificate to the KMS. In another embodiment, method 300 can include transmitting the public DeviceID key, the public Alias key, the device certificate and the alias certificate to the KMS. In some embodiments, step 314 can be executed as part of step 204. In some embodiments, the keys and certificates transmitted in step 314 can comprise ECDH keys while the keys used in step 302 and similar steps can comprise ECDSA, RSA, or similar keys.

Figure 4:
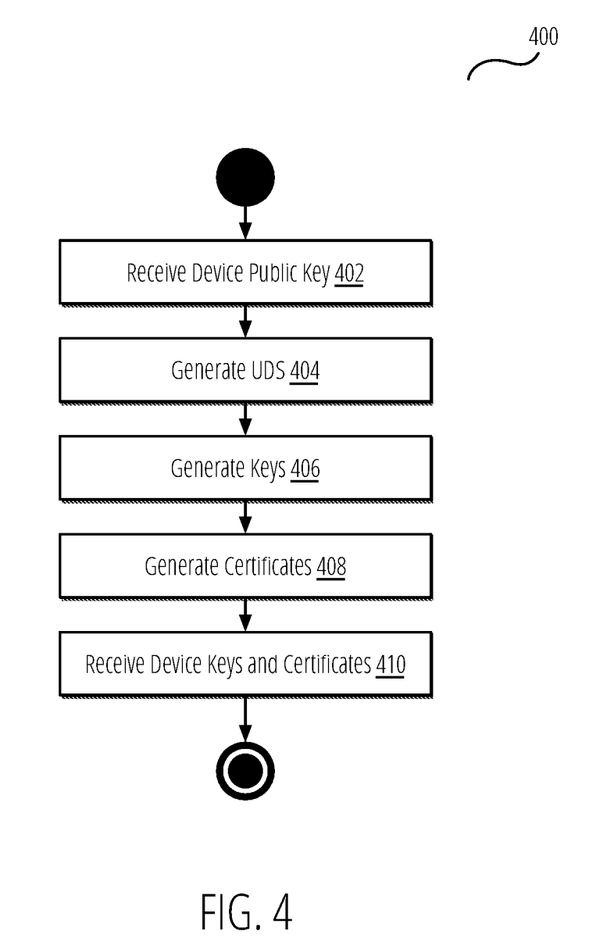
FIG. 4 is a flow diagram illustrating a method for generating keys and certificates by a KMS and validating a simulated device according to some of the example embodiments.

FIG. 4 is a flow diagram illustrating a method for generating keys and certificates by a KMS and validating a simulated device according to some of the example embodiments.

In step 402, method 400 can include receiving a device public key. In some embodiments, the device public key refers to the asymmetric public key (e.g., ECDH public key) generated by a simulate device as described previously. In some embodiments, step 402 can be executed as part of step 204, described previously.

In step 404, method 400 can include generating a UDS. In an embodiment, method 400 can generate a UDS using asymmetric cryptography. Specifically, method 400 can use the public device key ($pk_D$) and the private KMS key ($sk_K$). In some embodiments, the public device key also comprises an asymmetric public key. In some embodiments, the asymmetric private KMS key can comprise an ECDH private key. In some embodiments, method 400 can include generating the UDS by combining the public device key and private KMS key. Specifically, method 400 can include computing $UDS_K = pk_D \cdot sk_K$. That is, method 400 can combine the public device key and private KMS key, take the x component of the affine coordinates, and can optionally apply a KDF. In some embodiments, step 404 can be executed as part of step 206.

In step 406, method 400 can include generating one or more keys. In some embodiments, method 400 can generate keys according to an ECDSA algorithm. In some embodiments, the keys can comprise DICE keys. In some embodiments, the DICE keys include a DeviceID key and an Alias key. In an embodiment, the method 400 can be further configured to compute a hash or other similar value of a L0 code (referred to as $TCI_{L0}$) according to the DICE standards. In some embodiments, method 400 can include combining the UDS and the value of $TCI_{L0}$ to generate a common device identifier ($CDI_{L0}$). In some embodiments, method 400 can then use the value of $CDI_{L0}$ to seed the key generator (e.g., the ECDSA key generator) to generate the DeviceID and Alias keys. In some embodiments, step 406 can be executed as part of step 206.

In step 408, method 400 can include generating one or more digital certificate using the DeviceID and Alias keys. In some embodiments, method 400 can generate a device certificate (a digital certificate authenticating the L0 code) using the DeviceID key. Specifically, in an embodiment, the Device certificate can include the DeviceID public key portion and can be signed using the private key portion of the DeviceID. Alternatively, or in conjunction with the foregoing, method 400 can generate an Alias certificate using the DeviceID key and Alias key. Specifically, in some embodiments, method 400 can include the Alias public key portion in a digital certificate and sign the digital certificate using the private key portion of the DeviceID. In some embodiments, step 408 can be executed as part of step 206.

In step 410, method 400 can receives the keys and certificates from a simulated device. In some embodiments, method 400 can include receiving the DeviceID key pair, the Alias key pair, the device certificate, and the alias certificate from a simulated device. In another embodiment, method 300 can include transmitting the public DeviceID key, the public Alias key, the device certificate and the alias certificate from a simulated device. After step 410, the KMS can validate the received data as described more fully in step 210 of FIG. 2.

The foregoing embodiments provide numerous advantages over existing systems.

By using a simulator, the example embodiments can generate as many device key pairs as needed and no physical device is necessary to do so (e.g., when using a PUF or similar mechanism). Therefore, the example embodiments provide a low-cost, flexible, and simple setup since only a simulator is needed as compared to potentially tens of thousands of devices. Further, the use of large-scale physical device testing significantly increases the costs of testing and is difficult to manage and coordinate testing. Further, the example embodiments allow for easier changes to the KMS, device command application programming interfaces (APIs), hardware (e.g., replacing an eMMC with a UFS or NVMe device). Further, the example embodiments allow for intentionally testing devices that include known bugs, to allow for easy bug fixing. Further, many physical devices utilize monotonic counters for commands. Testing physical devices increases these counters and thus renders such devices "used." Further, multiple rounds of testing may damage physical devices, whereas a simulator is inherently not capable of such damage. In the example embodiments, the simulator can also provide the capability to simulate negative test cases (i.e., test cases where the wrong key or wrong digital certificate is used). With negative test cases, the KMS is expected to deny access and provide a corresponding response; failure to meet these expectations can be used as evidence of an issue with the KMS (or possibly device) for further analysis. Additionally, a failure to meet these expectations can indicate the KMS will not give permission to a device that does not have appropriate permissions (e.g., an incorrect signature). Therefore, the KMS and device are secured from hacking without the correct key and signature. In general, negative test cases are difficult or impossible to achieve when physical devices are used due to the cost of manufacturing a "faulty" device or intentionally introducing errors into live software.

Figure 5:
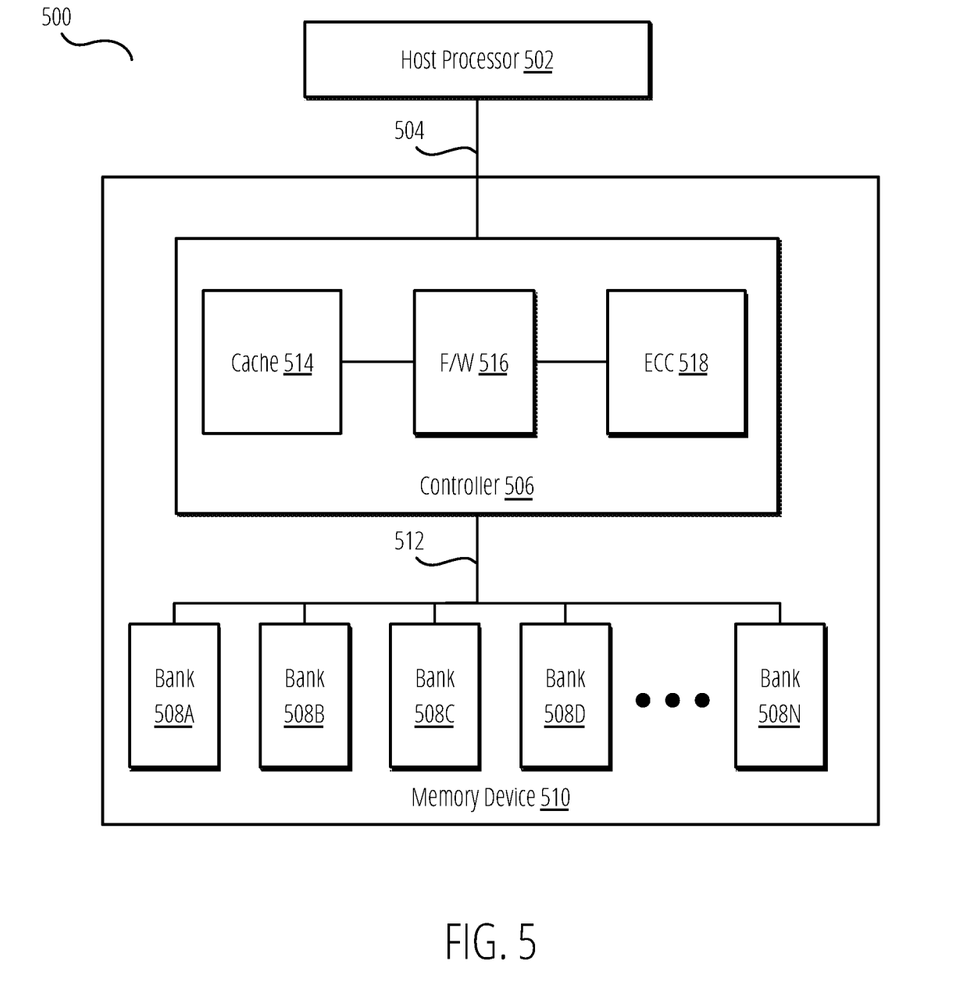
FIG. 5 is a block diagram illustrating a memory system according to some embodiments of the disclosure.

FIG. 5 is a block diagram illustrating a memory system according to some embodiments of the disclosure.

As illustrated, a computing system 500 includes a host processor 502 communicatively coupled to a memory device 510 via a bus 504. The memory device 510 comprises a controller 506 communicatively coupled to one or more memory banks (e.g., bank 608A, bank 608B, bank 608C, bank 608D, bank 608N, etc.), forming a memory array via an interface 512. As illustrated, the controller 506 includes a local cache 514, firmware 516, and an ECC module 518.

In the illustrated embodiment, host processor 502 can comprise any type of computer processor, such as a central processing unit (CPU), graphics processing unit (GPU), or other types of general-purpose or special-purpose computing devices. The host processor 502 includes one or more output ports that allow for the transmission of address, user, and control data between the host processor 502 and the memory device 510. In the illustrated embodiment, this communication is performed over the bus 504. In one embodiment, the bus 504 comprises an input/output (I/O) bus or a similar type of bus.

The memory device 510 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 506. In some embodiments, the controller 506 comprises a computing device configured to mediate access to and from banks (e.g., bank 608A, bank 608B, bank 608C, bank 608D, bank 608N, etc.). In one embodiment, the controller 506 comprises an ASIC or other circuitry installed on a printed circuit board housing the memory banks (e.g., bank 608A, bank 608B, bank 608C, bank 608D, bank 608N, etc.). In some embodiments, the controller 506 may be physically separate from the memory banks (e.g., bank 608A, bank 608B, bank 608C, bank 608D, bank 608N, etc.). The controller 506 communicates with the memory banks (e.g., bank 608A, bank 608B, bank 608C, bank 608D, bank 608N, etc.) over the interface 512. In some embodiments, this interface 512 comprises a physically wired (e.g., traced) interface. In other embodiments, the interface 512 comprises a standard bus for communicating with memory banks (e.g., bank 608A, bank 608B, bank 608C, bank 608D, bank 608N, etc.).

The controller 506 comprises various modules including local cache 514, firmware 516 and ECC module 518. In one embodiment, the various modules (e.g., local cache 514, firmware 516 and ECC module 518) comprise various physically distinct modules or circuits. In other embodiments, the modules (e.g., local cache 514, firmware 516 and ECC module 518) may completely (or partially) be implemented in software or firmware.

As illustrated, firmware 516 comprises the core of the controller and manages all operations of the controller 506. The firmware 516 may implement some or all of the methods described above. Specifically, the firmware 516 may implement the methods described in the foregoing figures.

Figure 6:
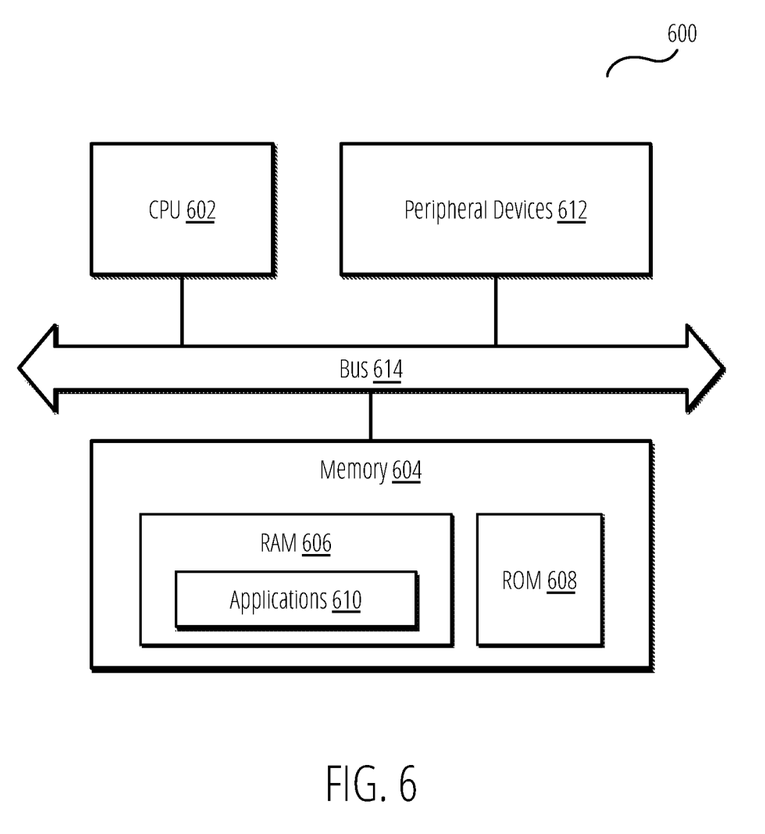
FIG. 6 is a block diagram of a computing device 600 according to some embodiments of the disclosure.

FIG. 6 is a block diagram of a computing device 600 according to some embodiments of the disclosure.

As illustrated, the device includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A system comprising:
a simulator, the simulator capable of instantiating at least one simulated device, the simulated device associated with a device public key and at least one generated device key and at least one generated device certificate; and
a server computing device comprising a hardware processor and a memory, communicatively coupled to the simulator and configured to:
receive the device public key,
generate a server unique device secret (UDS) using the device public key and a server private key,
generate at least one generated server key using the server UDS,
generate at least one generated server certificate using the at least one generated server key,
receive the at least one generated device key and the at least one generated device certificate, and
validate the at least one generated device key and the at least one generated device certificate by comparing the at least one generated device key and the at least one generated device certificate to the at least one generated server key and the at least one generated server certificate.

2. The system of claim 1, wherein the simulated device computes a device UDS using the server public key corresponding to the server private key and a device private key.

3. The system of claim 2, wherein the simulated device:
receives the server public key;
generates the device UDS using the device private key and the server public key;
generates the at least one generated device key using the device UDS; and
generates the at least one generated device certificate using the at least one generated device key.

4. The system of claim 2, wherein the server UDS is computed by combining the device public key and the server private key and the device UDS is computed by combining the device private key and the server public key.

5. The system of claim 4, wherein the device UDS and server UDS are equal.

6. The system of claim 1, wherein the device public key comprises an Elliptic-curve Diffie-Hellman (ECDH) public key and wherein the server private key comprises an ECDH private key.

7. The system of claim 1, wherein the at least one generated server key and the at least one generated device key both comprise Device Identity Composition Engine (DICE) keys.

8. The system of claim 7, wherein the DICE keys comprise Elliptic Curve Digital Signature Algorithm (ECDSA) keys.

9. The system of claim 1, wherein the at least one generated device certificate comprises a Device and Alias certificate and the at least one generated server certificate comprises a Device and Alias certificate.

10. A non-transitory computer-readable storage medium for tangibly storing computer program instructions capable of being executed by a computer processor, the computer program instructions defining steps of:
receiving a device key from a simulated device, the simulated device associated with a device public key and at least one generated device key and at least one generated device certificate;
generating a server unique device secret (UDS) using the device public key and a server private key;
generating at least one generated server key using the server UDS;
generating at least one generated server certificate using the at least one generated server key;
receiving the at least one generated device key and the at least one generated device certificate; and
validating the at least one generated device key and the at least one generated device certificate by comparing the at least one generated device key and the at least one generated device certificate to the at least one generated server key and the at least one generated server certificate.

11. The non-transitory computer-readable storage medium of claim 10, wherein the server UDS is computed by combining the device public key and the server private key.

12. The non-transitory computer-readable storage medium of claim 10, wherein the device public key comprises an Elliptic-curve Diffie-Hellman (ECDH) public key and wherein the server private key comprises an ECDH private key.

13. The non-transitory computer-readable storage medium of claim 10, wherein the at least one generated server key and the at least one generated device key both comprise Device Identity Composition Engine (DICE) keys.

14. The non-transitory computer-readable storage medium of claim 13, wherein the DICE keys comprise Elliptic Curve Digital Signature Algorithm (ECDSA) keys.

15. The non-transitory computer-readable storage medium of claim 10, wherein the at least one generated device certificate comprises a Device and Alias certificate and the at least one generated server certificate comprises a Device and Alias certificate.

16. A method comprising:
receiving a device key from a simulated device, the simulated device associated with a device public key and at least one generated device key and at least one generated device certificate;
generating a server unique device secret (UDS) using the device public key and a server private key;
generating at least one generated server key using the server UDS;
generating at least one generated server certificate using the at least one generated server key;
receiving the at least one generated device key and the at least one generated device certificate; and
validating the at least one generated device key and the at least one generated device certificate by comparing the at least one generated device key and the at least one generated device certificate to the at least one generated server key and the at least one generated server certificate.

17. The method of claim 16, wherein the server UDS is computed by combining the device public key and the server private key.

18. The method of claim 16, wherein the device public key comprises an Elliptic-curve Diffie-Hellman (ECDH) public key and wherein the server private key comprises an ECDH private key.

19. The method of claim 16, wherein the at least one generated server key and the at least one generated device key both comprise Device Identity Composition Engine (DICE) keys.

20. The method of claim 16, wherein the at least one generated device certificate comprises a Device and Alias certificate and the at least one generated server certificate comprises a Device and Alias certificate.

* * * * *